US012658181B2

(12) United States Patent
Assael et al.

(10) Patent No.: US 12,658,181 B2
(45) Date of Patent: Jun. 16, 2026

(54) INTERACTIVE DECODING OF WORDS FROM PHONEME SCORE DISTRIBUTIONS

(71) Applicant: GDM Holding LLC, Mountain View, CA (US)

(72) Inventors: Ioannis Alexandros Assael, London (GB); Brendan Shillingford, London (GB); Misha Man Ray Denil, London (GB)

(73) Assignee: GDM Holding LLC, Mountain View, CA (US)

( * ) Notice: Subject to any disclaimer, the term of this patent is extended or adjusted under 35 U.S.C. 154(b) by 181 days.

(21) Appl. No.: 18/285,345

(22) PCT Filed: Apr. 7, 2022

(86) PCT No.: PCT/EP2022/059331
§ 371 (c)(1),
(2) Date: Oct. 2, 2023

(87) PCT Pub. No.: WO2022/214623
PCT Pub. Date: Oct. 13, 2022

(65) Prior Publication Data
US 2024/0185842 A1     Jun. 6, 2024

(30) Foreign Application Priority Data

Apr. 7, 2021     (GR) .............................. 20210100234

(51) Int. Cl.
| | |
|---|---|
| *G10L 15/16* | (2006.01) |
| *G06V 40/20* | (2022.01) |
| *G10L 15/183* | (2013.01) |
| *G10L 15/187* | (2013.01) |

(52) U.S. Cl.
CPC .............. *G10L 15/16* (2013.01); *G06V 40/20* (2022.01); *G10L 15/183* (2013.01); *G10L 15/187* (2013.01)

(58) Field of Classification Search
CPC ..... G10L 15/16; G10L 15/187; G10L 15/183; G10L 15/20; G10L 15/25; G06V 40/20
See application file for complete search history.

(56) References Cited

U.S. PATENT DOCUMENTS

| | | | |
|---|---|---|---|
| 2002/0082831 A1* | 6/2002 | Hwang ................. | G10L 15/063 |
| | | | 704/249 |
| 2011/0218802 A1* | 9/2011 | Bouganim .............. | G10L 15/04 |
| | | | 704/E15.005 |
| 2018/0210874 A1* | 7/2018 | Fuxman ................. | G06N 3/045 |

(Continued)

FOREIGN PATENT DOCUMENTS

| | | | |
|---|---|---|---|
| WO | WO 2019219968 | 11/2019 | |
| WO | WO-2019219968 A1 * | 11/2019 ............... | G06N 3/08 |

OTHER PUBLICATIONS

Ogata, J., & Goto, M. (Sep. 2005). Speech repair: quick error correction just by using selection operation for speech input interfaces. In Interspeech (pp. 133-136). (Year: 2005).*

(Continued)

*Primary Examiner* — Hai Phan
*Assistant Examiner* — Nathan Tengbumroong
(74) *Attorney, Agent, or Firm* — Fish & Richardson P.C.

(57) ABSTRACT

Methods, systems, and apparatus, including computer programs encoded on computer storage media, for interactive decoding of a word sequence.

18 Claims, 4 Drawing Sheets

(56) References Cited

U.S. PATENT DOCUMENTS

| 2019/0139540 A1* | 5/2019 | Kanda | G10L 15/19 |
| 2020/0082808 A1* | 3/2020 | Li | G10L 15/08 |

OTHER PUBLICATIONS

Abadi et al., "Tensorflow: A system for large-scale machine learning" in USENIX Symposium on Operating Systems Design and Implementation, Nov. 2016, 265-283.

Afouras et al., "Deep audio-visual speech recognition" CoRR, Submitted on Dec. 2018, arXiv:1809.02108v2, 13 pages.

Afouras et al., "LRS3-TED: a large-scale dataset for visual speech recognition" CoRR, Submitted on Oct. 2018, arXiv:1809.00496v2, 2 pages.

Allauzen et al., "OpenFst: A general and efficient weighted finite-state transducer library" International Conference on Implementation and Application of Automata, Springer, 2007, 11-23.

Assael et al., "LipNet: End-to-end sentence-level lipreading" CoRR, Submitted on Dec. 2016, arXiv:1611.01599v2, 13 pages.

Chung et al., "Lip reading in the wild" in Asian Conference on Computer Vision, 2016, 17 pages.

Fernandez-Lopez et al., "Survey on automatic lip-reading in the era of deep learning" Image and Vision Computing, 2018, 27 pages.

Graves et al., "Connectionist temporal classification: Labelling unsegmented sequence data with recurrent neural networks" Proceedings of the 23rd international conference on Machine learning, Jun. 2006, 8 pages.

Graves et al., "Towards end-to-end speech recognition with recurrent neural networks" in international conference on machine learning, 2014, 9 pages.

Harwath et al., "Choosing useful word alternates for automatic speech recognition correction interfaces" Fifteenth Annual Conference of the International Speech Communication Association, 2014, 949-953.

Hcupnet.ahrq.gov [online], "Health Care Utilization Project Network, Hospital inpatient national statistics" available on or before May 12, 2019, via Internet Archive: Wayback Machine URL <https://web.archive.org/web/20190512032649/https://hcupnet.ahrq.gov/#setup>, retrieved on Sep. 5, 2024, URL <http://hcupnet.ahrq.gov>, 11 pages.

Hinton et al., "Deep neural networks for acoustic modeling in speech recognition: The shared views of four research groups" IEEE Signal Processing Magazine, vol. 29, No. 6, Oct. 2012, 82-97.

International Preliminary Report on Patentability in International Appln. No. PCT/EP2022/059331, mailed on Oct. 19, 2023, 7 pages.

International Search Report and Written Opinion in International Appln. No. PCT/EP2022/059331, mailed on Aug. 11, 2022, 13 pages.

Mohri et al., "Weighted finite-state transducers in speech recognition" Computer Speech & Language 16.1, Jan. 2002, 69-88.

Ney et al., "On structuring probabilistic dependences in stochastic language modelling." Computer Speech & Language 8.1, Jan. 1994, 1-38.

Ogata et al., "Speech Repair Quick Error Correction Just By Using Selection Operation for Speech Input Interfaces" Interspeech and Eurospeech, Sep. 2005, 4 pages.

Petridis et al., "Deep complementary bottleneck features for visual speech recognition," In International Conference on Acoustics, Speech, and Signal Processing, IEEE, 2016, 2304-2308.

Shillingford et al., "Large-scale visual speech recognition" CoRR, Submitted on Oct. 2018, arXiv:1807.05162v3, 21 pages.

Stafylakis et al., "Pushing the boundaries of audiovisual word recognition using residual networks and LSTMs" CoRR, Submitted on Nov. 2018, arXiv:1811.01194v1, 13 pages.

Toselli et al., "Chapter 6: Interactive machine translation" Multimodal interactive pattern recognition and applications, 2011, 131-137.

Wand et al., "Lipreading with long short-term memory" CoRR, Submitted on Jan. 2016, arXiv:1601.08188v1, 5 pages.

Zhou et al., "A review of recent advances in visual speech decoding," Image and vision computing, vol. 32, No. 9, 2014, 590-605.

* cited by examiner

INTERACTIVE DECODING OF WORDS FROM PHONEME SCORE DISTRIBUTIONS

CROSS-REFERENCE TO RELATED APPLICATIONS

This application is a National Stage Application under 35 U.S.C. § 371 and claims the benefit of International Application No. PCT/EP2022/059331, filed Apr. 7, 2022, which claims the benefit of priority to Greek application No. 20210100234, filed Apr. 7, 2021, the entirety of which is incorporated herein by reference.

BACKGROUND

This specification relates to decoding a sequence of words from a sequence of phoneme score distributions, e.g., as generated by a phoneme-level neural network by processing an input.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that decodes a sequence of words from a sequence of phoneme score distributions, i.e., a sequence that includes a respective phoneme score distribution at each of a plurality of time steps. In particular, the system employs an interactive decoding scheme in which candidate words to be added to the sequence are provided for presentation to a user on a user device and the user selects from the candidates in order to add a word to the sequence.

According to an aspect, there is provided a method performed by one or more computers. The method comprising obtaining, for each time step in a sequence of time steps, a respective phoneme score distribution for the time step that assigns a respective score to each of a plurality of phoneme tokens, the phoneme tokens comprising (i) a plurality of phonemes and (ii) a blank symbol that indicates that no phoneme is spoken at the time step; and generating, using the respective phoneme score distributions, a word sequence of words that is represented by the respective phoneme score distributions.

The generating comprising: initializing fringe data that specifies a plurality of states, wherein each state identifies (i) a candidate sequence of phonemes and (ii) a corresponding candidate sequence of words that is represented by the phonemes; and generating the word sequence by adding a new word to the word sequence at each of a plurality of update iterations.

Performing a particular update iteration comprises: updating the fringe data using the respective phoneme score distributions until the candidate sequence of words identified by each state specified by the fringe data includes a respective additional candidate word after the last word in the word sequence as of the particular update iteration; providing, for presentation on a user device, one or more of the additional candidate words specified by the states specified in the fringe data: receiving, from the user device, a user selection of one of the additional candidate words: and updating the word sequence by adding the selected additional candidate word to the end of the word sequence.

The method may further comprise the following optional features.

The fringe data may represent a search graph or tree for generating the word sequence. Each node of the search graph/tree may correspond to a state of the plurality of states defined in the fringe data.

Obtaining, for each time step in a sequence of time steps, a respective phoneme score distribution may comprise: processing a video of a speaker using a visual speech recognition neural network that is configured to process the video to generate the respective phoneme score distributions.

Obtaining, for each time step in a sequence of time steps, a respective phoneme score distribution may comprise: processing an audio input representing an utterance using an audio speech recognition neural network that is configured to process the audio input to generate the respective phoneme score distributions.

Generating the word sequence by adding a new word to the word sequence at each of a plurality of update iterations may comprise performing update iterations until a user input is received, e.g., a user input indicating that the word sequence is complete.

Generating the word sequence by adding a new word to the word sequence at each of a plurality of update iterations may comprise performing update iterations until the candidate sequences of phonemes identified by all of the states in the fringe data have been generated using all of the respective phoneme distributions at all of the time steps.

Updating the fringe data using the respective phoneme score distributions may comprise: removing from the fringe data any states that do not identify a candidate sequence of words that ends in the last word in the word sequence as of the particular update iteration.

Updating the fringe data using the respective phoneme score distributions may comprises: after removing from the fringe data any states that do not identify a candidate sequence of words that ends in the last word in the word sequence as of the particular update iteration, repeatedly performing operations until each state specified by the fringe data identifies an additional candidate word after the last word in the word sequence as of the particular update iteration. The operations may comprise: for each particular state in the fringe data that does not yet end in an additional candidate word after the last word in the word sequence as of the particular update iteration; generating, from the particular state, a plurality of new candidate states; and generating a respective ranking score for each new candidate state using the respective score distributions: and updating the fringe data to only specify a predetermined number of states with the highest ranking scores.

Providing, for presentation on a user device, the additional candidate words specified by the states specified in the fringe data may comprise: providing the additional candidate words for presentation in an order according to the ranking scores for the corresponding states.

Generating, from the particular state, a plurality of new candidate states may comprise, for each phoneme token: generating a new state that identifies a candidate phoneme sequence that includes the phonemes in the candidate sequence identified by the particular state followed by the phoneme token.

Each state may further identify (iii) a time step in the sequence of time steps. Generating a respective ranking score for each new candidate state using the respective probability distribution may comprise: generating the respective ranking score for each new state generated from a given existing state from the respective score assigned to the phoneme token that was added to the given existing state at the time step immediately following the time step identified by the given existing state, wherein the new state identifies the time step immediately following the time step identified by the existing state.

The respective ranking score for each new state may be further based on a finite state transducer (FST) path weight assigned to the new state by a decoder FST based on a relation between the corresponding candidate phoneme sequence for the new state and the corresponding candidate word sequence for the new state.

According to another aspect, there is provided a system comprising: one or more computers; and one or more storage devices storing instructions that, when executed by the one or more computers, cause the one or more computers to perform the respective operations of the above method aspect.

According to a further aspect, there is provided one or more computer-readable storage media storing instructions that when executed by one or more computers cause the one or more computers to perform the respective operations of the method aspect.

It will be appreciated that features described in the context of one aspect may be combined with features described in the context of another aspect.

Particular embodiments of the subject matter described in this specification can be implemented so as to realize one or more of the following advantages.

Visual speech recognition (VSR) is the task of predicting text from the movement of a user's mouth, i.e., solely relying on the visual information provided in a video of the speaker without any corresponding audio. In other words, a system performing VSR can serve as an automated lip-reading system. VSR has numerous applications ranging from silent speech interfaces to medical applications for people with speech impairments. Since the vocal tract cannot be visually observed (as it can be through the audio signal in audio speech recognition), the mapping from phonemes to words is inherently ambiguous when performing VSR. Consequently, the predictive performance, e.g., as measured by word error rate (WER), of VSR systems is far higher than that of audio speech recognition systems.

Interactively decoding a sequence of words from a word-level model can facilitate inputting correct text despite high uncertainty. This is trivial to implement using beam search in word-level models. However, recent work has shown that phoneme-level models are more suitable for encoding uncertainties for visual speech recognition compared to non-phoneme approaches. Interactive decoding in this scenario is not straightforward, however, as words correspond to a variable number of phonemes, and commonly used losses for phoneme-level models (e.g., CTC and RNN-Transducer losses) marginalize the alignment of the label sequence to the input, complicating the relationship between time in phoneme-level beam search and the number of resulting words.

This specification describes interactive decoding techniques that allow for a user to guide the decoding process from phoneme score distributions generated by a phoneme model to words. The "interaction points" pause the decoding procedure and allow the user to select one of the shortlisted word candidates. This regular narrowing of the search space improves decoding quality and accounts for the inherent ambiguity in VSR systems. A continued and guided human-machine interaction process for visual speech recognition is therefore provided.

This same technique can also be applied in other situations where such ambiguity exists, e.g., in audio speech recognition performed on a noisy or otherwise corrupted audio signal or on the outputs generated by a VSR model that is based on other kinds of sub-word units, e.g., grapheme-level models that generate grapheme score distributions or word piece-level models that generate word piece score distributions.

The technique may be applied to a system for providing user input to a computing device or system. As discussed above, a silent user interface may be provided for those with speech impairments or for locations where speaking is not appropriate and other more traditional means of user input are not available or suitable. The decoded word sequence may correspond to an instruction for controlling a computer, a device associated with the computer or other agent. The controlled system may then carry out the instruction accordingly. The decoded word sequence may correspond to input for entry in a form field or other field in an electronic document as another example.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
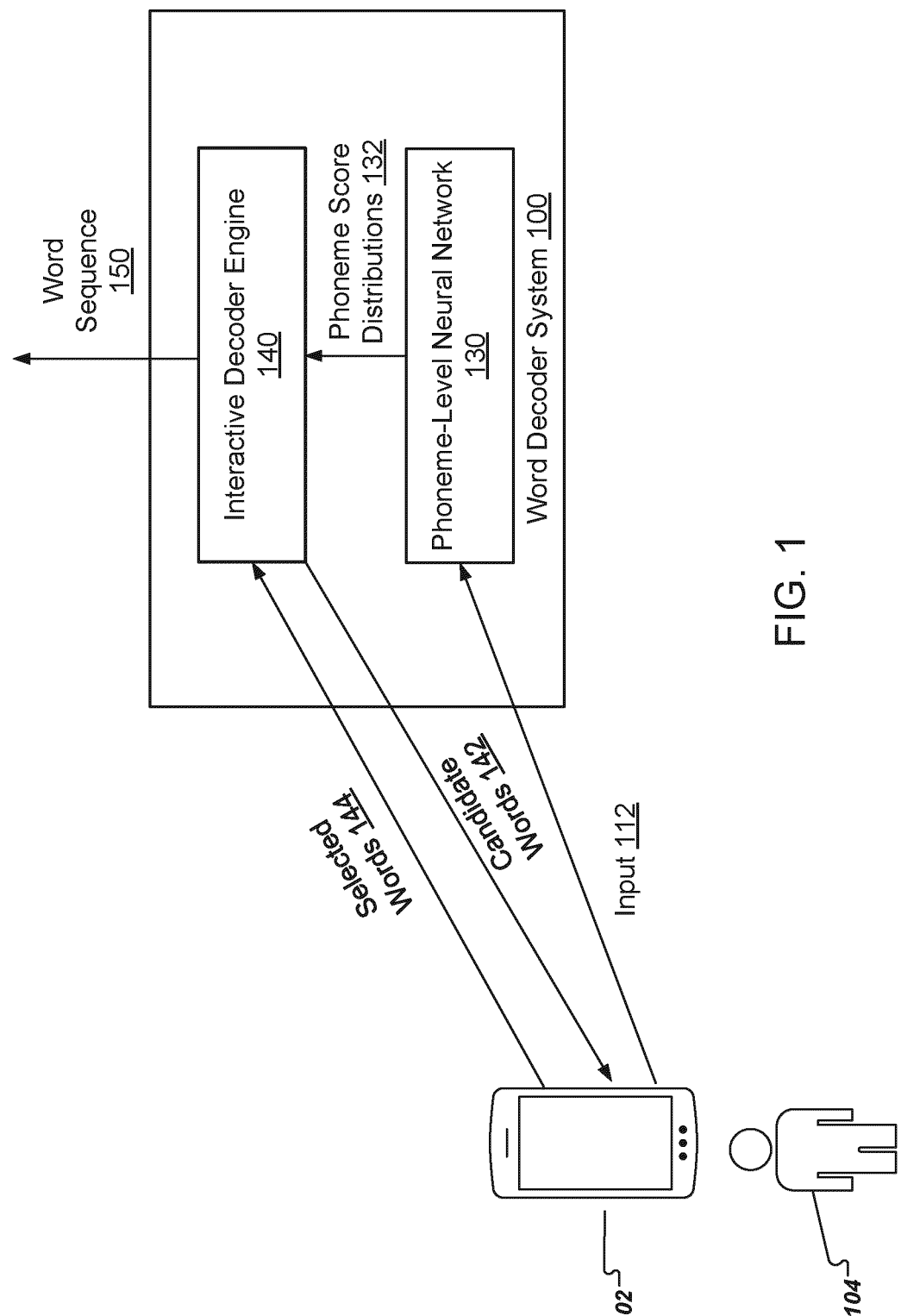
FIG. 1 shows an example word decoder system.

FIG. 1 shows an example word decoder system 100. The word decoder system 100 is an example of a system implemented as computer programs on one or more computers in one or more locations, in which the systems, components, and techniques described below can be implemented.

The word decoder system 100 receives an input 112 and processes the input 112 to generate as output a word sequence 150, i.e., a sequence of words in a natural language that represents the input 112.

More specifically, the system 100 receives the input 112 and processes the input 112 using a phoneme-level machine learning model, e.g., a phoneme-level neural network 130. The phoneme-level machine learning model is configured to process the input 112 to generate a sequence of phoneme score distributions 132, i.e., a sequence that includes a respective phoneme score distribution 132 at each of a plurality of time steps. A phoneme score distribution includes a respective score, e.g., a probability or other numerical value, for each of a plurality of phoneme tokens.

As one example, the input 112 can be a video of a speaker (without the corresponding audio) and the system 100 can generate the sequence of phoneme score distributions 132 by processing the video of the speaker using a visual speech recognition neural network that is configured to process the video to generate the respective phoneme score distributions 132 as part of performing visual speech recognition (VSR).

As another example, the input 112 can include the video of the speaker and the corresponding audio and the system 100 can generate the sequence of phoneme score distributions 132 by processing the video of the speaker and the corresponding audio using an audio-visual speech recognition neural network that is configured to process the video and the audio to generate the respective phoneme score distributions 132 as part of performing audio-visual speech recognition.

As yet another example, the input 112 can be an audio input, i.e., an audio waveform or audio signal, representing an utterance and the system 100 can generate the sequence of phoneme score distributions 132 by processing the audio input using an audio speech recognition neural network that is configured to process the audio input to generate the respective phoneme score distributions as part performing audio speech recognition 132.

An interactive decoder engine 140 within the system 100 then decodes the word sequence 150 from the sequence of phoneme score distributions 132. That is, the interactive decoder engine 140 maps the sequence of phoneme score distributions 132 to the word sequence 150 that represents the input 112.

The decoder engine 140 is referred to as "interactive" because, during the decoding process, the engine 140 repeatedly sends a set of candidate words 142 that are candidates for being added to the end of the current word sequence 150 to a user device 102 for presentation to a user 104.

In particular, directly decoding a word sequence from the phoneme sequences requires the system 100 to resolve ambiguities in the mapping of phonemes to words. That is, the sequence of phoneme score distributions 132 can include scores that represent uncertainty between which phoneme should be assigned to which time step. Additionally, as will be described below, the phoneme tokens include a blank symbol and the same word sequence can therefore be represented by many different phoneme sequences. By performing an "interactive" decoding, the system 100 can use user input to resolve these ambiguities and accurately decode the word sequence.

The user device 102 can be, e.g., a laptop computer, a desktop computer, a mobile device, or any other computer that is capable of presenting a set of candidate words 142 to the user 104, e.g., by presenting the candidate words visually in a user interface of the user device 102 or by outputting speech of the candidate words through a speaker of the user device 102, and receiving, from the user 104, an input, e.g., a touch input or an input submitted using an input device, selecting one of the candidate words 142.

For example, the user device 102 can present a user interface that displays any words that have previously been added to the word sequence 150 and a candidate set of words 142 to be added to the end of the current word sequence 150. The user interface can allow the user to submit an input selecting one of the candidate sets of words 142. Optionally, the user interface can also allow the user to submit an input indicating that the sequence is complete, i.e., that the selected word is the final word in the sequence 150 or that the sequence 150 is already complete and no words should be added.

The user device 102 then provides the selected word 144 to the decoder engine 140, which adds the selected word 144 to the end of the current word sequence 150 and then continues with the decoding process. The interactive decoding process can therefore operate on a word-by-word basis and provides a continued and guided human-machine interaction process.

The interactive decoding process is described in more detail below with reference to FIGS. 2-4.

In some implementations, the system 100 is implemented on the user device 102, i.e., as one or more computer programs executing on the user device 102.

In some other implementations, the system 100 is implemented on one or more computers remote from the user device and provides the candidate words 142 to and receives the selected words 144 from the user device 102 over a data communication network, e.g., a wired or wireless network.

In some implementations, the system 100 receives the input 112 from the user device 102. For example, the input 112 can be video, audio, or both of the user 104 captured by one or more sensors, e.g., camera sensors, microphones, or both, of the user device 102.

In some other implementations, the system 100 receives the input 112 from a different source. For example, the system 100 can receive the input 102 from one or more sensors that are coupled to one or more computers that are different from the user device 102.

Once the word sequence 150 is generated, the system 100 can use the word sequence 150 for any of a variety of purposes. For example, the system 100 can provide the word sequence 150 for presentation, e.g., on the user device 102 or on a different computer, or for a different purpose, e.g., as a natural language instruction for controlling a computer or other agent, as an entry in form field or other field in an electronic document, and so on. As another example, the system 100 can generate audio of the word sequence 150 being spoken, e.g., using a text-to-speech engine, and provide the audio for play back through one or more speakers of the user device 102 or of a different device. This can allow, for example, a VSR output to be made audible to other people even though the video of the speaker did not include audio, e.g., if the vocal chords of the speaker are not functioning correctly or if the speaker was mouthing the words without emitting any sound.

Figure 2:
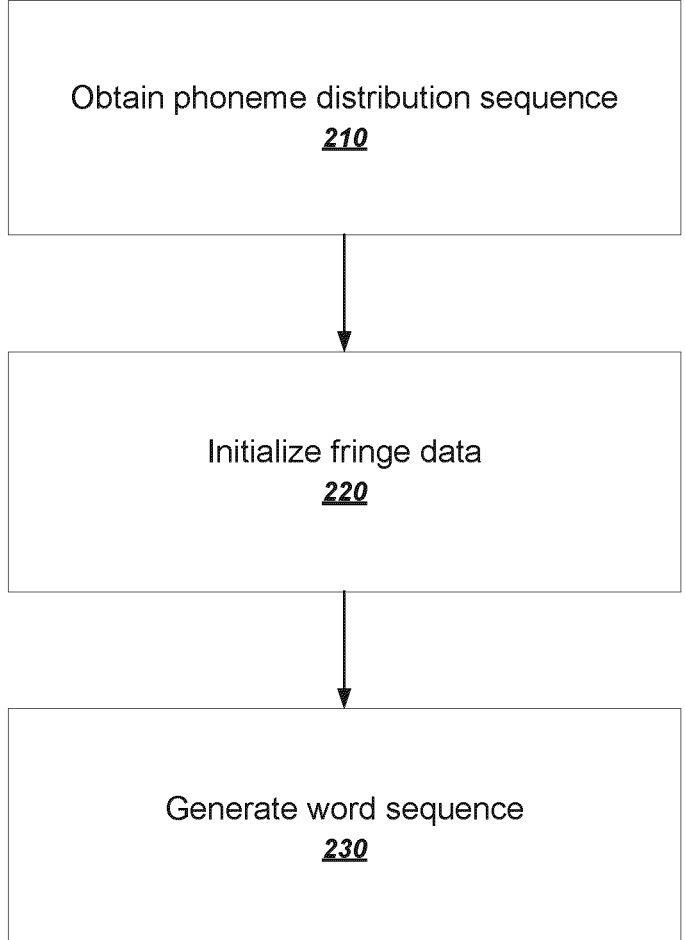
FIG. 2 is a flow diagram of an example process for decoding a word sequence.

FIG. 2 is a flow diagram of an example process 200 for decoding a word sequence. For convenience, the process 200 will be described as being performed by a system of one or more computers located in one or more locations. For example, a word decoder system, e.g., the word decoder system 100 of FIG. 1, appropriately programmed, can perform the process 200.

The system obtains a sequence of phoneme score distributions, i.e., a sequence that includes a respective phoneme score distribution at each of a plurality of time steps (step 210).

Generally, the sequence of phoneme score distributions is generated by a phoneme-level machine learning model, e.g., a neural network, by processing a corresponding input, i.e., so that the decoded sequence of words is a sequence of words that represents the corresponding input.

As one example, the system can generate the sequence of phoneme score distributions by processing a video of a speaker (without the corresponding audio) using a visual speech recognition neural network that is configured to process the video to generate the respective phoneme score distributions.

As another example, the system can generate the sequence of phoneme score distributions by processing the video of the speaker and the corresponding audio using an audiovisual speech recognition neural network that is configured to process the video and the audio to generate the respective phoneme score distributions.

As another example, the system can generate the sequence of phoneme score distributions by processing an audio input representing an utterance using an audio speech recognition neural network that is configured to process the audio input to generate the respective phoneme score distributions.

The phoneme score distribution for any given time step assigns a respective score to each of a plurality of phoneme tokens. The phoneme tokens generally include at least (i) a plurality of phonemes and (ii) a blank symbol that indicates that no phoneme is spoken at the time step. That, is the phoneme tokens include phonemes in a vocabulary of phonemes for the natural language and a blank symbol that is not in the vocabulary.

The phoneme-level machine learning model can be any appropriate machine learning model that has been trained on an objective function for the task that the model is configured to perform. For example, the model can have been trained on task-specific training data using a Connectionist Temporal Classification (CTC) loss. The CTC loss is described in, for example, A. Graves, S. Fernández, F. Gomez, and J. Schmidhuber, "Connectionist temporal classification: Labelling unsegmented sequence data with recurrent neural networks," in International Conference on Machine Learning, 2006, pp. 369-376, the entire contents of which are hereby incorporated by reference herein in their entirety. As another example, the model can have been trained on task-specific training data using a Recurrent Neural Network Transducer (RNN-T) based loss. The RNN-T based loss is described in, for example, A. Graves, Sequence Transduction with Recurrent Neural Networks, available at arXiv: 1211.3711, the entire contents of which are hereby incorporated by reference herein in their entirety.

The system then generates, using the respective phoneme score distributions, a sequence of words that is represented by the respective phoneme score distributions.

To generate the word sequence, the system initializes fringe data that specifies a plurality of states (step 220).

Each state identifies (i) a candidate sequence of phonemes and (ii) a corresponding candidate sequence of words that is represented by the phonemes. When initialized, the candidate sequences identified by each state are empty. That is, for initialization, each state identifies a sequence of phonemes that does not include any phonemes and a sequence of words that does not include any words.

In some implementations, and as will be described in more detail below, each state also identifies a time step in the sequence of time steps, i.e., from the time steps in the sequence of phoneme score distributions. The time step identified by a given state is the time step of the score distribution that was used to select the last phoneme in the candidate sequence of phonemes identified by the state. Because the phoneme tokens include the "blank" phoneme and, optionally, because repeated consecutive instances of the same phoneme are treated as a single instance of the phoneme, the same word can be represented using multiple different sequences of phoneme tokens that have different lengths. Accordingly, different states can be associated with different time steps.

Generally, each state will also identify the components needed to compute a ranking score for the state. These components are described in more detail below.

The system generates the sequence of words by adding a new word to the word sequence at each of a plurality of update iterations (step 230).

Generally, at each update iteration, the system updates the fringe data using the sequence of phoneme score distributions until the candidate sequence of words identified by each state specified by the fringe data ends in an additional candidate word, i.e., an additional word after the last word in the candidate sequence of words as of the beginning update iteration. That is, the system updates the fringe data until all of the states have added a respective additional word to their corresponding candidate word sequence (relative to the candidate word sequence at the beginning of the iteration).

For at least some of the iterations, the system then uses user inputs to determine which new word should be added to the word sequence at the iteration using the updated fringe data.

This is described in more detail below with reference to FIG. 3.

Figure 3:
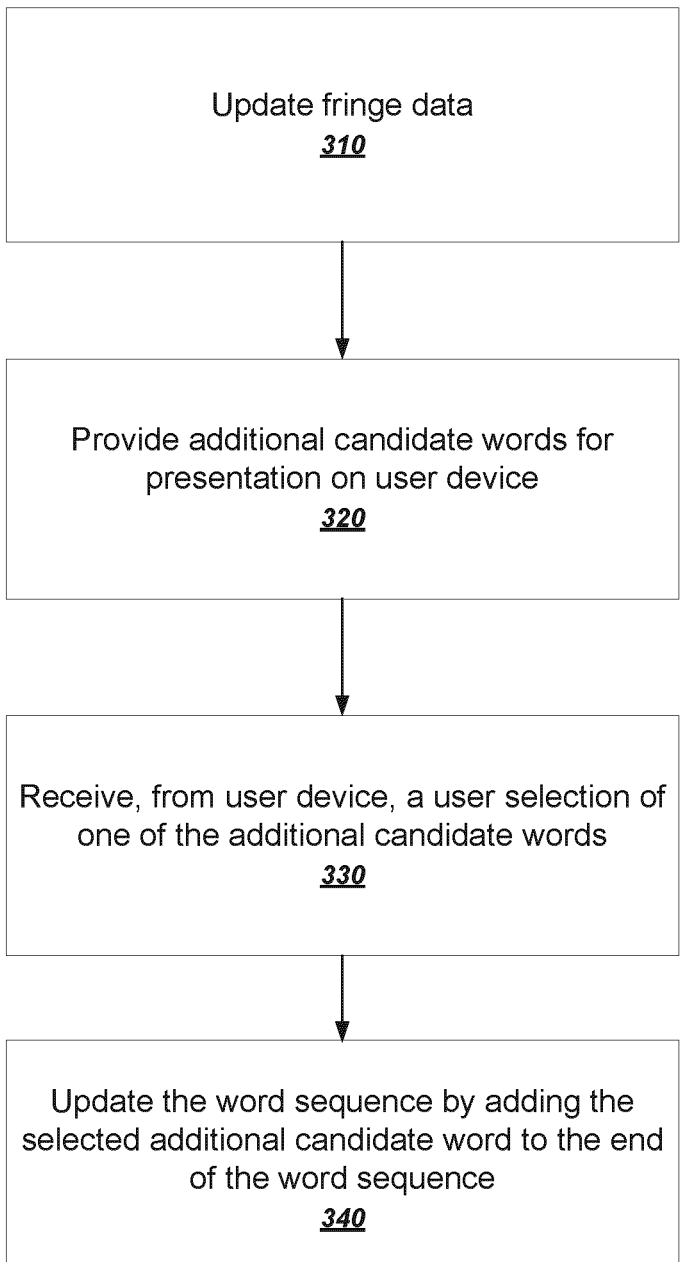
FIG. 3 is a flow diagram of an example process for performing a particular update iteration.

FIG. 3 is a flow diagram of an example process 300 for performing a particular update iteration. For convenience, the process 300 will be described as being performed by a system of one or more computers located in one or more locations. For example, a word decoder system, e.g., the word decoder system 100 of FIG. 1, appropriately programmed, can perform the process 300.

When the particular update iteration is the first update iteration, at the beginning of the iteration, the candidate phoneme and word sequences identified by each state are empty.

When the particular update iteration is not the first update iteration, at the beginning of the iteration, the candidate phoneme and word sequences identified by each state are non-empty.

The system updates the fringe data using the respective phoneme score distributions (step 310.

In particular, the system updates the fringe data until the candidate sequence of words identified by each state specified by the fringe data includes a respective additional candidate word after the last word in the word sequence as of the particular update iteration.

For example, to update the fringe data, the system initially removes, from the fringe data, any states that do not identify a candidate sequence of words that ends in the last word in the word sequence as of the particular update iteration, i.e., any states that identify a candidate sequence of words that does not end in the word that was added to the word sequence at the preceding iteration.

After removing these states from the fringe data, the system repeatedly updates the states in the fringe data until each state specified by the fringe data identifies an additional candidate word, i.e., has added a word to the candidate word sequence identified by the fringe that is after the last word in the word sequence as of the particular update iteration. During the updating, a state that identifies an additional candidate word will be referred to as "frozen." Thus, the system can update the fringe data until all states in the fringe data become "frozen."

To update the states in the fringe data at any given time point, the system can identify which states in the fringe data do not yet end in an additional candidate word, i.e., are not frozen.

For each non-frozen state, the system can generate, from the non-frozen state, a plurality of new candidate states. In particular, for a particular state, the system can generate a respective new state for each phoneme token in the set. In particular, the new state for a given phoneme token identifies a candidate phoneme sequence that includes the phonemes in the candidate sequence identified by the non-frozen state followed by the given phoneme token.

The system can then generate a respective ranking score for each new candidate state (generated from each non-frozen state) using the respective score distributions.

In particular, for each new state generated from a given existing state, the system can generate the respective ranking score for the new state from the respective score assigned to the phoneme token that was added to the given existing state at the time step immediately following the time step identified by the given existing state. That is, the system increments the time step identified by the given existing state by one, and uses the score assigned to the phoneme token that was added to the given existing state in the phoneme score distribution at the incremented time step.

For example, the ranking score for a given new state that identifies a given phoneme sequence can include a component that is based on the phoneme score distributions and is computed based on (i) a first total score according to the phoneme score distributions for a phoneme token sequence that is produced in the incremented number of time steps and that ends in the blank symbol and (ii) a second total score according to the phoneme score distributions for a phoneme token sequence that is produced in the incremented number of time steps and that ends in the last phoneme in the phoneme sequence. A phoneme sequence can be generated from a phoneme token sequence by removing any occurrences of the blank symbol and, optionally, treating any repeated consecutive instances of the same phoneme as a single instance of the phoneme.

As a particular example, the component can be equal to the negative of the logarithm of the sum of the first total score and the second total score.

Computing these first and second total scores is described in more detail in A. Graves and N. Jaitly, "Towards end-to-end speech recognition with recurrent neural networks," in International conference on machine learning, 2014, pp. 1764-1772, the entire contents of which are hereby incorporated by reference herein in their entirety.

The respective ranking score for each new state can also include another component that is equal to a finite state transducer (FST) path weight assigned to the new state by a decoder FST. The decoder FST assigns path weights based on a relation between the corresponding candidate phoneme sequence for the new state and the corresponding candidate word sequence for the new state. That is, the decoder FST maps the candidate phoneme sequence for the new state to a candidate sequence of words and then assigns a candidate path weight to the new state based on the candidate sequence of words.

The decoder FST employs a phoneme to word mapping that maps each possible sequence of phonemes to zero or more words and a word language model in which sequences of words are assigned a weight or probability. The decoder FST can use any of a variety of conventional phoneme to word dictionaries for the phoneme to word mapping. Similarly, the decoder FST can use any of a variety of conventional word language models that assign weights to word sequences. For example the probability assigned to a given word sequence can be based on a frequency with which the word sequence occurs in a specified corpus of text.

In some implementations, the path weight assigned to a given new state is the weight assigned to the candidate word sequence specified by the given new state. That is, when the new state is non-finalized, the phoneme(s) at the end of the candidate phoneme sequence specified by the new state that are not mapped to any words by the phoneme to word mapping (the "un-finalized phonemes") are not considered in computing the path weight.

In some other implementations, the path weight assigned to a given new state is also based on candidate words that can be generated by expanding the un-finalized phonemes using other phonemes in the vocabulary until one or more candidate words are generated. This is referred to as a word language model "with backoff." That is, the path weight assigned to a given new state is based on the weight assigned by the word language model to the candidate word sequence(s) that are generated by adding a candidate word generated by expanding the un-finalized phonemes in the phoneme sequence to the candidate word sequence specified by the new state. When there are multiple such candidate word sequences, the path weight for the given new state can be equal to, e.g., the maximum weight assigned to any of the candidate word sequences or an average of the weight assigned to the candidate word sequences.

Using a decoder FST to assign path weights to states is described in more detail in Mehryar Mohri, Fernando Pereira, and Michael Riley. Weighted finite-state transducers in speech recognition. Computer Speech & Language, 16(1): 69-88, 2002, the entire contents of which are hereby incorporated by reference herein in their entirety.

Finally, the system can update the fringe data to only specify a predetermined number of states with the highest ranking scores. That is, the system identifies, from among the frozen states and the new states generated from the non-frozen states, a threshold number of highest scoring states, and updates the fringe data to only specify these identified states.

If any of the non-frozen states in the updated fringe data identify an additional word after this update, i.e., if the phoneme sequence for a non-frozen state is mapped to an additional word by a dictionary or by other data used by the system to map phonemes to words, the system identifies the non-frozen state as frozen and adds the additional word to the word sequence specified by the non-frozen state.

By repeatedly performing this updating, the system continues updating the fringe data until a time point is reached at which no states can be identified that do not yet end in an additional candidate word, i.e., all of the states in the fringe are frozen.

The system provides, for presentation on a user device, one or more of the additional candidate words specified by the states specified in the fringe data (step 320.

In some implementations, the system determines to provide candidates for presentation to a user at every update iteration, i.e., each time a new word is to be added to the word sequence. In some other implementations, when certain criteria are satisfied, the system automatically determines not to use user input to select the next word and instead automatically adds the additional candidate word from the highest-scoring state in the fringe data as the next word in the word sequence. For example, the system can determine to automatically add a new word without presenting candidates for user selection when the score gap between the highest scoring state and the second highest scoring state (or, the highest scoring state that identifies a different additional word from the overall highest scoring state) exceeds a threshold. As another example, the system can determine to automatically add a new word without presenting candidates for user selection when a threshold number of highest scoring states all identify the same additional word.

Providing candidate words for presentation to and selection by a user will also be referred to as an "interaction point" during decoding.

In some cases, the system provides the candidate words specified by all of the states in the fringe data.

In some other cases, the system provides the candidate words specified by only a highest-scoring subset of the states of the states in the fringe data, e.g., by each state that has a score that is higher than a threshold score or by a threshold number of highest-scoring states.

As a particular example, the system can provide the additional candidate words for presentation in an order according to the ranking scores for the corresponding states, i.e., so that additional candidate words corresponding to higher-scoring states are more likely to be seen by users than those corresponding to lower-scoring states.

The system receives, from the user device, a user selection of one of the additional candidate words (step 330. For example, the user device can present a user interface that displays the words (if any) in the word sequence at the beginning of the particular update iteration and the one or more additional candidate words and allows the user to select one of the presented additional candidate words by submitting an input through the user interface, e.g., a touch input or an input with an input device.

The system updates the word sequence by adding the selected additional candidate word to the end of the word sequence (step 340.

The system can continue performing iterations of the process 300 until a termination criterion is satisfied, e.g., until a user input is received, e.g., a user input indicating that the word sequence is complete (or finalized), until the highest ranking state has become associated with the last time step in the phoneme sequence, or until the candidate sequences of phonemes identified by all of the states in the fringe data have been generated using all of the respective phoneme distributions at all of the time steps.

Figure 4:
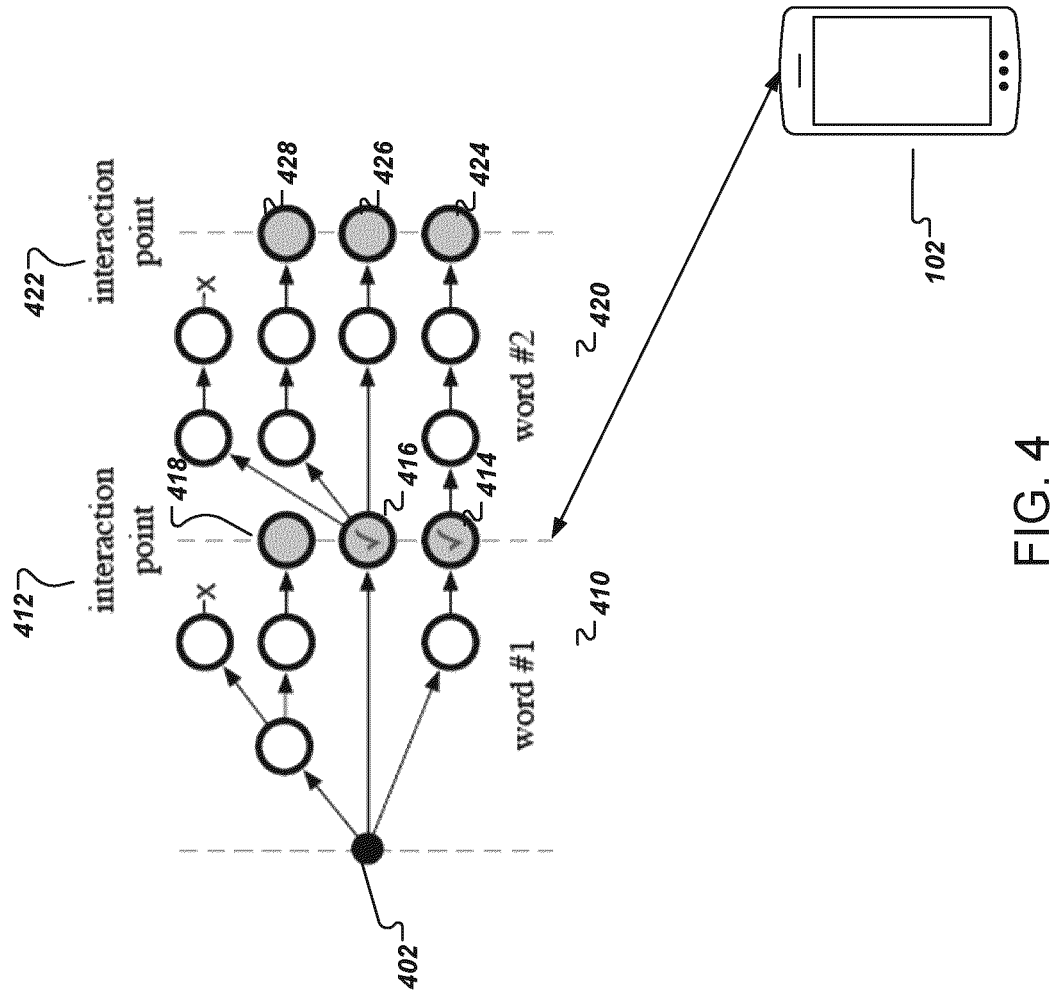
FIG. 4 shows two example update iterations during the decoding of a word sequence.

FIG. 4 shows an example of two update iterations 410 and 420 during the decoding of a word sequence that illustrate the decoding process. In the example of FIG. 4, the fringe data specifies three states.

The decoding begins at an initial state 402, at which all of the states in the fringe data are empty.

At the first update iteration 410, the system updates the states in the fringe data until an interaction point 412 is reached. At the interaction point 412, two of the states 414 and 416 identify the same word and one of the states 418 identifies a different word. Thus, there are two total candidate words that are provided for presentation on the user device 102. The user selects the word identified by states 414 and 416, and the state 418 is therefore removed from the fringe data at the start of update iteration 420.

In FIG. 4, the addition of a phoneme to a candidate phoneme sequence specified by a state is represented as a circle. As can be seen from FIG. 4, the states 414, 416, and 418 each specify phoneme sequences with different numbers of phonemes when the interaction point 412 is reached. The phoneme sequence for state 414 has two phonemes, the phoneme sequence for state 416 has one phoneme, and the phoneme sequence for state 418 has three phonemes.

During the update iteration 420, the system continues updating the fringe data until an interaction point 422 is reached. At the interaction point 422, there are three states 424, 426, and 428 in the fringe data and each identifies a different word. These three words can be presented to the user on the user device 102 and the decoding process can continue for another update iteration once the user has selected one of the three words. In this way, the user input resolves ambiguities during the decoding process and results in a high-quality word sequence.

As can be seen from FIG. 4, the fringe data may represent a search graph/tree.

For example, Table 1 shows the performance of a system employing the described techniques ("Interactive") relative to the performance of a conventional technique ("Standard") that uses a beam search that is guided by the decoder FST to decode words. As can be seen in Table 1, the described technique has a significantly lower word error rate (WER) than the conventional technique when both techniques use a language model (LM) with the same number of bigrams as part of the decoder FST. Both the conventional and the described techniques were used on top of the outputs generated by the same visual speech recognition neural network.

TABLE 1

| Decoding method | WER |
| --- | --- |
| Standard (10 k bigram LM) | 62.4% |
| Standard (5-gram LM) | 44.5% |
| Interactive (10 k bigram LM) | 33.9% |

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages: and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine: in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices: magnetic disks, e.g., internal hard disks or removable disks: magneto optical disks: and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well: for example, feedback provided to the user can be any form of sensory feedback, e.g., visual feedback, auditory feedback, or tactile feedback: and input from the user can be received in any form, including acoustic, speech, or tactile input. In addition, a computer can interact with a user by sending documents to and receiving documents from a device that is used by the user: for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method for performing automatic speech recognition and performed by one or more computers, the method comprising:

processing an input comprising one or more of a video of a speaker speaking an utterance or audio of the utterance using a speech recognition neural network to generate, for each time step in a sequence of time steps of the utterance, a respective phoneme score distribution for the time step that assigns a respective score to each of a plurality of phoneme tokens, the phoneme tokens comprising (i) a plurality of phonemes and (ii) a blank symbol that indicates that no phoneme is spoken at the time step;

generating, using the respective phoneme score distributions, a word sequence of words that represents a decoded word sequence of the utterance, the generating comprising:

initializing fringe data that specifies a plurality of states, wherein each state identifies (i) a candidate sequence of phonemes and (ii) a corresponding candidate sequence of words that is represented by the phonemes; and generating the word sequence by adding a new word to the word sequence at each of a plurality of update iterations, wherein performing a particular update iteration comprises:

updating the fringe data using the respective phoneme score distributions by, for each state in the fringe data, extending, using the respective phoneme score distributions that are generated by the speech recognition neural network and that each assign a respective score to each of the plurality of phoneme tokens, the candidate sequence of words identified by the state to include a respective additional candidate word after the last word in the word sequence as of the particular update iteration;

providing, for presentation on a user device, one or more of the additional candidate words specified by the states specified in the fringe data;

receiving, from the user device, a user selection of one of the additional candidate words;

responsive to the user selection of the additional candidate word:

updating the word sequence by adding the additional candidate word selected by the user after the last word of the word sequence; and removing, from the fringe data, any state that does not identify a candidate sequence of words that ends in the additional candidate word selected by the user.

2. The method of claim 1, wherein obtaining, for each time step in a sequence of time steps, a respective phoneme score distribution comprises:

processing a video of a speaker using a visual speech recognition neural network that is configured to process the video to generate the respective phoneme score distributions.

3. The method of claim 1, wherein obtaining, for each time step in a sequence of time steps, a respective phoneme score distribution comprises:

processing an audio input representing an utterance using an audio speech recognition neural network that is configured to process the audio input to generate the respective phoneme score distributions.

4. The method of claim 1, wherein generating the word sequence by adding a new word to the word sequence at each of a plurality of update iterations comprises performing update iterations until a user input is received.

5. The method of claim 1, wherein generating the word sequence by adding a new word to the word sequence at each of a plurality of update iterations comprises performing update iterations until the candidate sequences of phonemes identified by all of the states in the fringe data have been generated using all of the respective phoneme distributions at all of the time steps.

6. The method of claim 1, wherein updating the fringe data using the respective phoneme score distributions comprises:

after removing from the fringe data any states that do not identify a candidate sequence of words that ends in the last word in the word sequence as of the particular update iteration, repeatedly performing operations until each state specified by the fringe data identifies an additional candidate word after the last word in the word sequence as of the particular update iteration, the operations comprising:

for each particular state in the fringe data that does not yet end in an additional candidate word after the last word in the word sequence as of the particular update iteration:

generating, from the particular state, a plurality of new candidate states; and generating a respective ranking score for each new candidate state using the respective score distributions; and updating the fringe data to only specify a predetermined number of states with the highest ranking scores.

7. The method of claim 6, wherein providing, for presentation on a user device, the additional candidate words specified by the states specified in the fringe data comprises:

providing the additional candidate words for presentation in an order according to the ranking scores for the corresponding states.

8. The method of claim 6, wherein generating, from the particular state, a plurality of new candidate states comprises, for each phoneme token:

generating a new state that identifies a candidate phoneme sequence that includes the phonemes in the candidate sequence identified by the particular state followed by the phoneme token.

9. The method of claim 8, wherein each state further identifies (iii) a time step in the sequence of time steps, and wherein generating a respective ranking score for each new candidate state using the respective probability distribution comprises:

generating the respective ranking score for each new state generated from a given existing state from the respective score assigned to the phoneme token that was added to the given existing state at the time step immediately following the time step identified by the given existing state, wherein the new state identifies the time step immediately following the time step identified by the existing state.

10. The method of claim 9, wherein the respective ranking score for each new state is further based on a finite state transducer (FST) path weight assigned to the new state by a decoder FST based on a relation between the corresponding candidate phoneme sequence for the new state and the corresponding candidate word sequence for the new state.

11. One or more non-transitory computer-readable storage media storing instructions that when executed by one or more computers cause the one or more computers to perform operations comprising:

processing an input comprising one or more of a video of a speaker speaking an utterance or audio of the utterance using a speech recognition neural network to generate, for each time step in a sequence of time steps of the utterance, a respective phoneme score distribution for the time step that assigns a respective score to each of a plurality of phoneme tokens, the phoneme tokens comprising (i) a plurality of phonemes and (ii) a blank symbol that indicates that no phoneme is spoken at the time step;

generating, using the respective phoneme score distributions, a word sequence of words that represents a decoded word sequence of the utterance, the generating comprising:

initializing fringe data that specifies a plurality of states, wherein each state identifies (i) a candidate sequence of phonemes and (ii) a corresponding candidate sequence of words that is represented by the phonemes; and generating the word sequence by adding a new word to the word sequence at each of a plurality of update iterations, wherein performing a particular update iteration comprises:

updating the fringe data using the respective phoneme score distributions by, for each state in the fringe data, extending, using the respective phoneme score distributions that are generated by the speech recognition neural network and that each assign a respective score to each of the plurality of phoneme tokens, the candidate sequence of words identified by the state to include a respective additional candidate word after the last word in the word sequence as of the particular update iteration;

providing, for presentation on a user device, one or more of the additional candidate words specified by the states specified in the fringe data;

receiving, from the user device, a user selection of one of the additional candidate words;

responsive to the user selection of the additional candidate word:

updating the word sequence by adding the additional candidate word selected by the user after the last word of the word sequence; and removing, from the fringe data, any state that does not identify a candidate sequence of words that ends in the additional candidate word selected by the user.

12. A system comprising one or more computers and one or more storage devices storing instructions that when executed by the one or more computers cause the one or more computers to perform operations comprising:

processing an input comprising one or more of a video of a speaker speaking an utterance or audio of the utterance using a speech recognition neural network to generate, for each time step in a sequence of time steps of the utterance, a respective phoneme score distribution for the time step that assigns a respective score to each of a plurality of phoneme tokens, the phoneme tokens comprising (i) a plurality of phonemes and (ii) a blank symbol that indicates that no phoneme is spoken at the time step;

generating, using the respective phoneme score distributions, a word sequence of words that represents a decoded word sequence of the utterance, the generating comprising:

initializing fringe data that specifies a plurality of states, wherein each state identifies (i) a candidate sequence of phonemes and (ii) a corresponding candidate sequence of words that is represented by the phonemes; and generating the word sequence by adding a new word to the word sequence at each of a plurality of update iterations, wherein performing a particular update iteration comprises:

updating the fringe data using the respective phoneme score distributions by, for each state in the fringe data, extending, using the respective phoneme score distributions that are generated by the speech recognition neural network and that each assign a respective score to each of the plurality of phoneme tokens, the candidate sequence of words identified by the state to include a respective additional candidate word after the last word in the word sequence as of the particular update iteration;

providing, for presentation on a user device, one or more of the additional candidate words specified by the states specified in the fringe data;

receiving, from the user device, a user selection of one of the additional candidate words;

responsive to the user selection of the additional candidate word:

updating the word sequence by adding the additional candidate word selected by the user after the last word of the word sequence; and removing, from the fringe data, any state that does not identify a candidate sequence of words that ends in the additional candidate word selected by the user.

13. The system of claim 12, wherein obtaining, for each time step in a sequence of time steps, a respective phoneme score distribution comprises:

processing a video of a speaker using a visual speech recognition neural network that is configured to process the video to generate the respective phoneme score distributions.

14. The system of claim 12, wherein obtaining, for each time step in a sequence of time steps, a respective phoneme score distribution comprises:

processing an audio input representing an utterance using an audio speech recognition neural network that is configured to process the audio input to generate the respective phoneme score distributions.

15. The system of claim 12, wherein generating the word sequence by adding a new word to the word sequence at each of a plurality of update iterations comprises performing update iterations until a user input is received.

16. The system of claim 12, wherein generating the word sequence by adding a new word to the word sequence at each of a plurality of update iterations comprises performing update iterations until the candidate sequences of phonemes identified by all of the states in the fringe data have been generated using all of the respective phoneme distributions at all of the time steps.

17. The system of claim 12, wherein updating the fringe data using the respective phoneme score distributions comprises:

after removing from the fringe data any states that do not identify a candidate sequence of words that ends in the last word in the word sequence as of the particular update iteration, repeatedly performing operations until each state specified by the fringe data identifies an additional candidate word after the last word in the word sequence as of the particular update iteration, the operations comprising:

for each particular state in the fringe data that does not yet end in an additional candidate word after the last word in the word sequence as of the particular update iteration:

generating, from the particular state, a plurality of new candidate states; and generating a respective ranking score for each new candidate state using the respective score distributions; and updating the fringe data to only specify a predetermined number of states with the highest ranking scores.

18. The system of claim 17, wherein providing, for presentation on a user device, the additional candidate words specified by the states specified in the fringe data comprises:

providing the additional candidate words for presentation in an order according to the ranking scores for the corresponding states.

* * * * *